US012804345B2

(12) United States Patent
Sun et al.

(10) Patent No.: US 12,804,345 B2
(45) Date of Patent: Nov. 17, 2026

(54) AUDIO CONTROL METHOD, AUDIO CONTROL DEVICE AND IN-VEHICLE SOUND SYSTEM

(71) Applicant: AAC Microtech (Changzhou) Co., Ltd., Changzhou City (CN)

(72) Inventors: Shuyuan Sun, Changzhou (CN); Yiming Meng, Changzhou (CN); Xin Zhang, Changzhou (CN)

(73) Assignee: AAC Microtech (Changzhou) Co., Ltd., Changzhou City (CN)

( * ) Notice: Subject to any disclaimer, the term of this patent is extended or adjusted under 35 U.S.C. 154(b) by 108 days.

(21) Appl. No.: 19/064,650

(22) Filed: Feb. 26, 2025

(65) Prior Publication Data

US 2026/0129391 A1 May 7, 2026

Related U.S. Application Data

(63) Continuation of application No. PCT/CN2024/129867, filed on Nov. 5, 2024.

(51) Int. Cl.

*H04S 7/00* (2006.01)
*H04R 5/02* (2006.01)
*H04R 5/04* (2006.01)
*H04S 3/02* (2006.01)

(52) U.S. Cl.

CPC ............... *H04S 7/301* (2013.01); *H04R 5/02* (2013.01); *H04R 5/04* (2013.01); *H04S 3/02* (2013.01); *H04R 2499/13* (2013.01); *H04S 2400/01* (2013.01); *H04S 2400/11* (2013.01); *H04S 2400/15* (2013.01)

(58) Field of Classification Search

CPC .. H04R 5/02; H04R 5/04; H04S 7/301; H04S 3/02

See application file for complete search history.

(56) References Cited

U.S. PATENT DOCUMENTS 11,778,408 B2 * 10/2023 Sunder .................... H04S 7/303 381/302
12,457,467 B2 * 10/2025 Feng ................ G10K 11/17821
2008/0049948 A1 * 2/2008 Christoph ............... H04S 7/301 381/86

(Continued)

FOREIGN PATENT DOCUMENTS

CN 114390427 A * 4/2022 ............... H04R 5/02

*Primary Examiner* — Olisa Anwah
(74) *Attorney, Agent, or Firm* — Wiersch Law Group

(57) ABSTRACT

Provided are an audio control method, an audio control device, and an in-vehicle sound system. The audio control method includes: acquiring an initial auditory model of a target user in an in-vehicle acoustic environment and an ideal auditory model of the target user in a reference acoustic environment; fitting the ideal auditory model and the initial auditory model based on predetermined fitting constraints to obtain target acoustic characteristic parameters corresponding to an acoustic signal output by each respective target speaker of the plurality of target speakers; and generating a target acoustic transfer function of the respective target speaker to the target user based on the target acoustic characteristic parameters, and updating the target acoustic transfer function to a digital filter of the respective target speaker.

20 Claims, 9 Drawing Sheets

(56) References Cited

U.S. PATENT DOCUMENTS

| | | | | |
|---|---|---|---|---|
| 2010/0305725 | A1* | 12/2010 | Brannmark | H04S 7/301 700/94 |
| 2020/0059724 | A1* | 2/2020 | Walther | H04S 7/303 |
| 2023/0217200 | A1* | 7/2023 | Sun | H04S 7/30 381/103 |
| 2024/0345650 | A1* | 10/2024 | Winzell | G01S 19/42 |
| 2025/0324213 | A1* | 10/2025 | Sun | H04S 3/02 |

* cited by examiner

AUDIO CONTROL METHOD, AUDIO CONTROL DEVICE AND IN-VEHICLE SOUND SYSTEM

CROSS REFERENCE TO RELATED APPLICATIONS

The present disclosure is a continuation of PCT Patent Application No. PCT/CN2024/129867, filed Nov. 5, 2024, which is incorporated by reference herein in its entirety.

TECHNICAL FIELD

The present disclosure relates to the technical field of sound field control and, in particular, to an audio control method, an audio control device, and an in-vehicle sound system.

BACKGROUND

With the increasing intelligence of a vehicle cabin, users are seeking a more refined and comfortable cabin environment and immersive interactive experience. An in-vehicle sound system has also become an important part of enhancing the driving experience, and users have more and more demands for personalized and differentiated sound experience. However, the traditional design solution of the in-vehicle sound system is difficult to meet the user's personalized and customized needs. On the one hand, there is a difference between a user's preferred listening environment and an in-vehicle listening environment, and the traditional design solution does not establish a correlation between the user's preferred listening environment and the in-vehicle listening environment. On the other hand, different users have different physiological and acoustic characteristics and subjective listening preferences, so designing the in-vehicle sound system with standardized test and development equipment and objective indicators can only achieve an average effect of a large portion of the population in the end, and for a designated user, neither objective indicators nor subjective listening sensation can get into the best state.

SUMMARY

The present disclosure provides an audio control method, an audio control device, and an in-vehicle sound system, which at least can at least solve the problem that the in-vehicle audio system in the related art is difficult to perform audio output according to the user's personalized listening preference.

A first aspect of embodiments of the present disclosure provides an audio control method for an in-vehicle sound system. The in-vehicle sound system is configured with a plurality of target speakers, and the audio control method includes: acquiring an initial auditory model of a target user in an in-vehicle acoustic environment and an ideal auditory model of the target user in a reference acoustic environment; fitting the ideal auditory model and the initial auditory model based on predetermined fitting constraints to obtain target acoustic characteristic parameters corresponding to an acoustic signal output by each respective target speaker of the plurality of target speakers; and generating a target acoustic transfer function of the respective target speaker to the target user based on the target acoustic characteristic parameters, and updating the target acoustic transfer function to a digital filter of the respective target speaker.

A second aspect of the embodiments of the present disclosure provides an audio control device for an in-vehicle sound system. The in-vehicle sound system is configured with a plurality of target speakers, and the audio control device includes an acquisition module, a fitting module, and a generation module.

The acquisition module is configured to acquire an initial auditory model of a target user in an in-vehicle acoustic environment and an ideal auditory model of the target user in a reference acoustic environment.

The fitting module is configured to fit the ideal auditory model and the initial auditory model based on predetermined fitting constraints to obtain target acoustic characteristic parameters corresponding to an acoustic signal output by each respective target speaker of the plurality of target speakers.

The generation module is configured to generate a target acoustic transfer function of the respective target speaker to the target user based on the target acoustic characteristic parameters, and update the target acoustic transfer function to a digital filter of the respective target speaker.

A third aspect of the embodiments of the present disclosure provides an in-vehicle sound system including a memory, a processor, and a plurality of target speakers. Each of the plurality of target speakers is configured to sound based on a corresponding target acoustic transfer function. The processor is configured to execute a computer program stored on the memory. The processor is configured to perform, when executing the computer programs, the audio control method for the in-vehicle sound system according to the first aspect of the embodiments of the present disclosure.

A fourth aspect of the embodiments of the present disclosure provides a non-transient computer-readable storage medium storing a computer program. The computer program is configured to implement, when executed by a processor, the audio control method for the in-vehicle sound system according to the first aspect of the embodiments of the present disclosure.

As can be seen from the above, in the audio control method, the audio control device, and the in-vehicle sound system in the embodiments of the present disclosure, an initial auditory model of a target user in an in-vehicle acoustic environment and an ideal auditory model of the target user in a reference acoustic environment are acquired; the ideal auditory model and the initial auditory model are fitted based on predetermined fitting constraints to obtain target acoustic characteristic parameters corresponding to an acoustic signal output by each respective target speaker of the plurality of target speakers; and a target acoustic transfer function of the respective target speaker to the target user is generated based on the target acoustic characteristic parameters, and the target acoustic transfer function is updated to a digital filter of the respective target speaker. In the present disclosure, the user's ideal auditory model in the reference acoustic environment is simulated through the fitting calculation of the auditory model, and applied to the in-vehicle sound system, i.e., the acoustic transfer function of each loudspeaker in the in-vehicle sound system is obtained by fitting the auditory model, and then the corresponding loudspeaker can be controlled by the acoustic transfer function, so that the audio emitted by the in-vehicle sound system can fully conforms to the user's listening preferences, and the user can enjoy specific listening experience and achieve personalized sound customization in the in-vehicle acoustic environment.

DETAILED DESCRIPTION OF THE EMBODIMENTS

Figure 1:
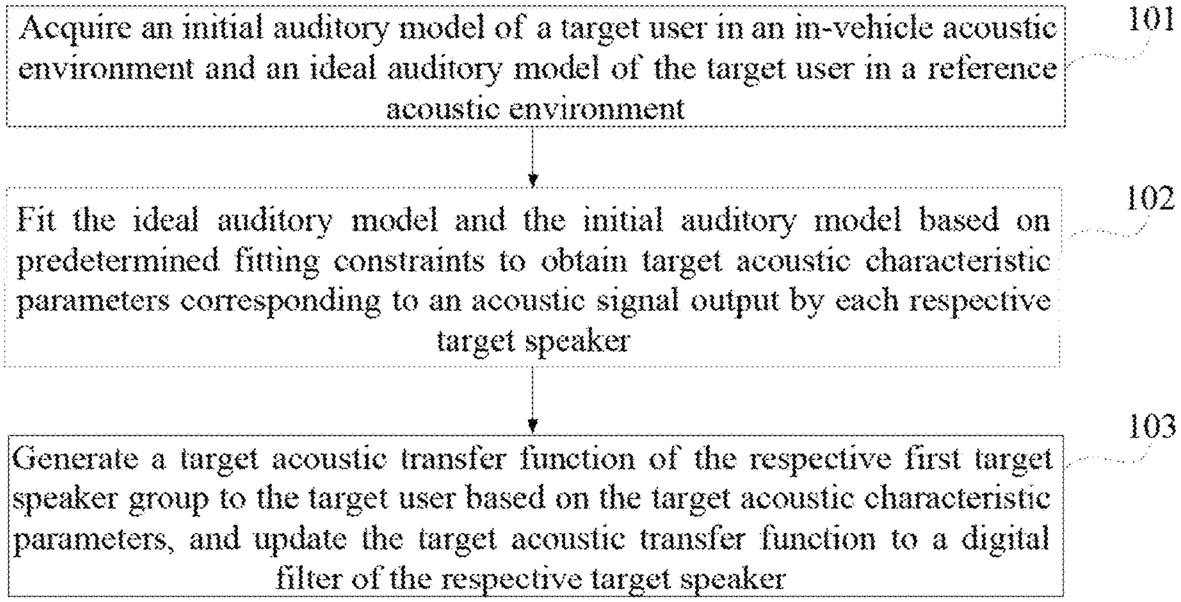
FIG. 1 is a schematic basic flow chart of an audio control method for an in-vehicle sound system according to a first embodiment of the present disclosure.

To make the objectives, features and advantages of the present disclosure more obvious and understandable, technical solutions in embodiments of the present disclosure are described in detail clearly and completely hereinafter with reference to the accompanying drawings. Apparently, the described embodiments are only a part, but not all, of the embodiments of the present disclosure. Based on the embodiments of the present disclosure, all other embodiments obtained by a person of ordinary skill in the art without creative efforts fall within the scope of protection of the present disclosure.

In the description of the embodiments of the present disclosure, it is to be understood that orientation or positional relationship indicated by terms "length," "width," "up," "down," "front," "rear," "left," "right," "vertical," "horizontal," "top," "bottom," "inside," "outside" and the like are orientations or positional relationships based on those shown in the accompanying drawings, which are intended only to facilitate the description of embodiments of the present disclosure and to simplify the description, and are not intended to indicate or imply that the device or element referred to must have a particular orientation, be constructed and operated with a particular orientation, and therefore are not to be construed as a limitation of the embodiments of the present disclosure.

In addition, the terms "first," "second," etc. are merely for descriptive purposes, and are not to be understood as indicating or implying relative importance or implicitly specifying the number of technical features indicated. Thus, a feature defined with the terms "first," "second," etc. may expressly or implicitly include one or more such features. In the description of embodiments of the present disclosure, "plurality" or "multiple" means two or more, unless otherwise expressly and specifically limited.

In the description of the embodiments of the present disclosure, unless otherwise specified and limited, terms "mounted," "connected," "connecting," "fixed," etc. are to be understood in a broad sense. For example, it may be a fixed connection, a removable connection, or a one-piece connection, it may be a mechanical connection, or an electrical connection, it may be a direct connection, or an indirect connection through an intermediate medium, and it may be a connection between two elements or an interaction between the two elements. For those of ordinary skill in the art, specific meanings of the above terms in the embodiments of the present disclosure may be understood according to specific situations.

In order to solve the problem in the related art that it is difficult for an in-vehicle audio system to perform audio output according to a user's personalized listening preference, a first embodiment of the present disclosure provides an audio control method for an in-vehicle audio system, where the in-vehicle audio system is configured with a plurality of target speakers distributed in different locations within a target vehicle cabin in the in-vehicle audio system.

FIG. 1 is a schematic basic flow chart of an audio control method for an in-vehicle sound system in this embodiment, where the audio control method for the in-vehicle sound system includes operations 101 to 103 described below.

In operation 101, an initial auditory model of a target user in an in-vehicle audio environment and an ideal auditory model of the target user in a reference audio environment are acquired.

Specifically, the auditory model in this embodiment may include an acoustic signal matrix corresponding to the target user's left ear (i.e., a matrix corresponding to acoustic signals received by the target user's left car) and an acoustic signal matrix corresponding to the target user's right car (i.e., a matrix corresponding to acoustic signals received by the target user's right ear). The ideal auditory model is an auditory model that conforms to the target user's listening preference in the reference acoustic environment. The reference acoustic environment in this embodiment may include a physical environment and a sound architecture environment. The physical environment may be a listening environment that meets certain acoustic characteristic index requirements, including but not limited to an anechoic chamber, an audition room, a reverberation room, or a specific acoustic laboratory or environment that simulates certain predetermined scenarios. The sound architecture environment may be a stereophonic system, a 5.1 channel system, a 7.1 channel system, a 7.1.4 channel system, etc., which is not limited herein.

Figure 2:
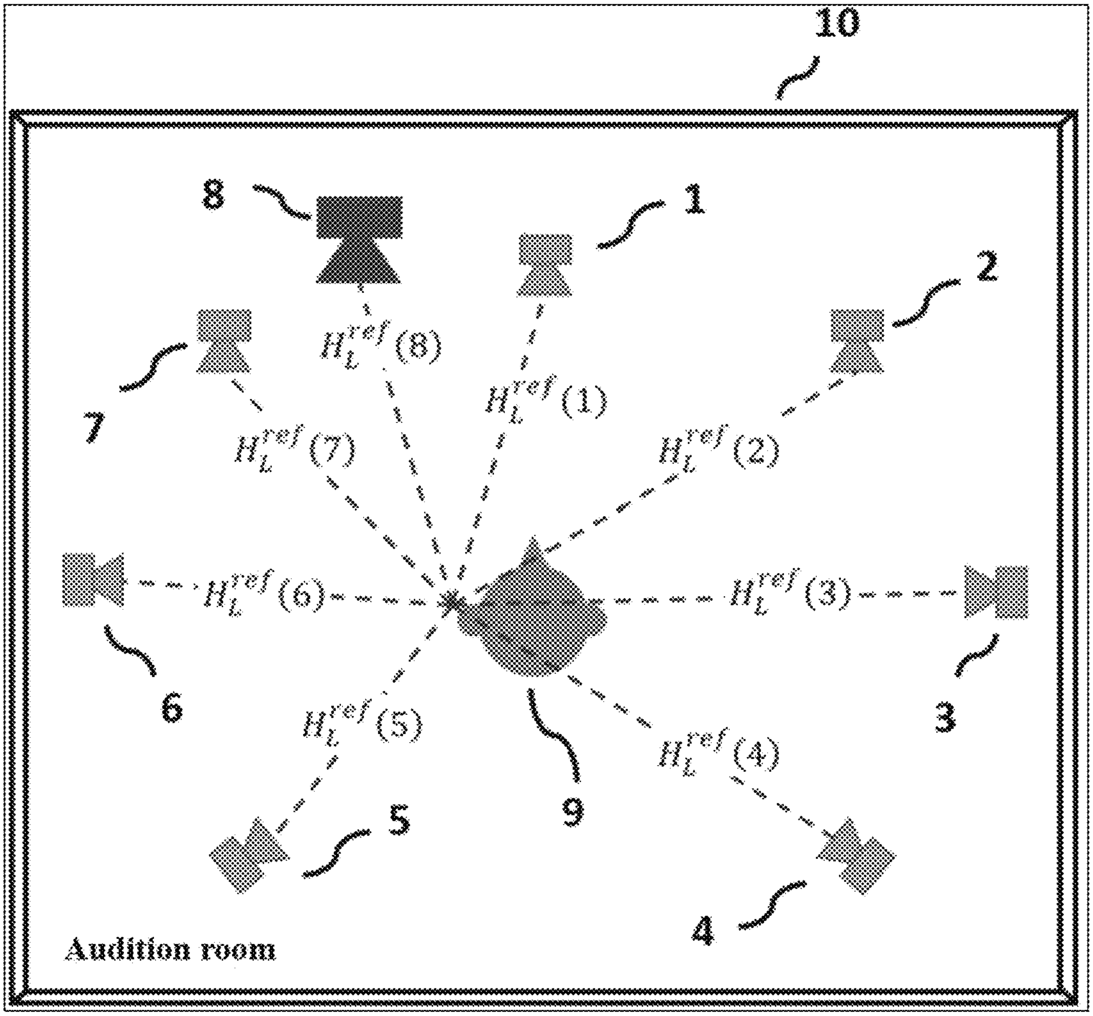
FIG. 2 is a diagram showing relative location relationships between a left ear of a target user and speaker groups in a reference acoustic environment according to the first embodiment of the present disclosure.
Figure 3:
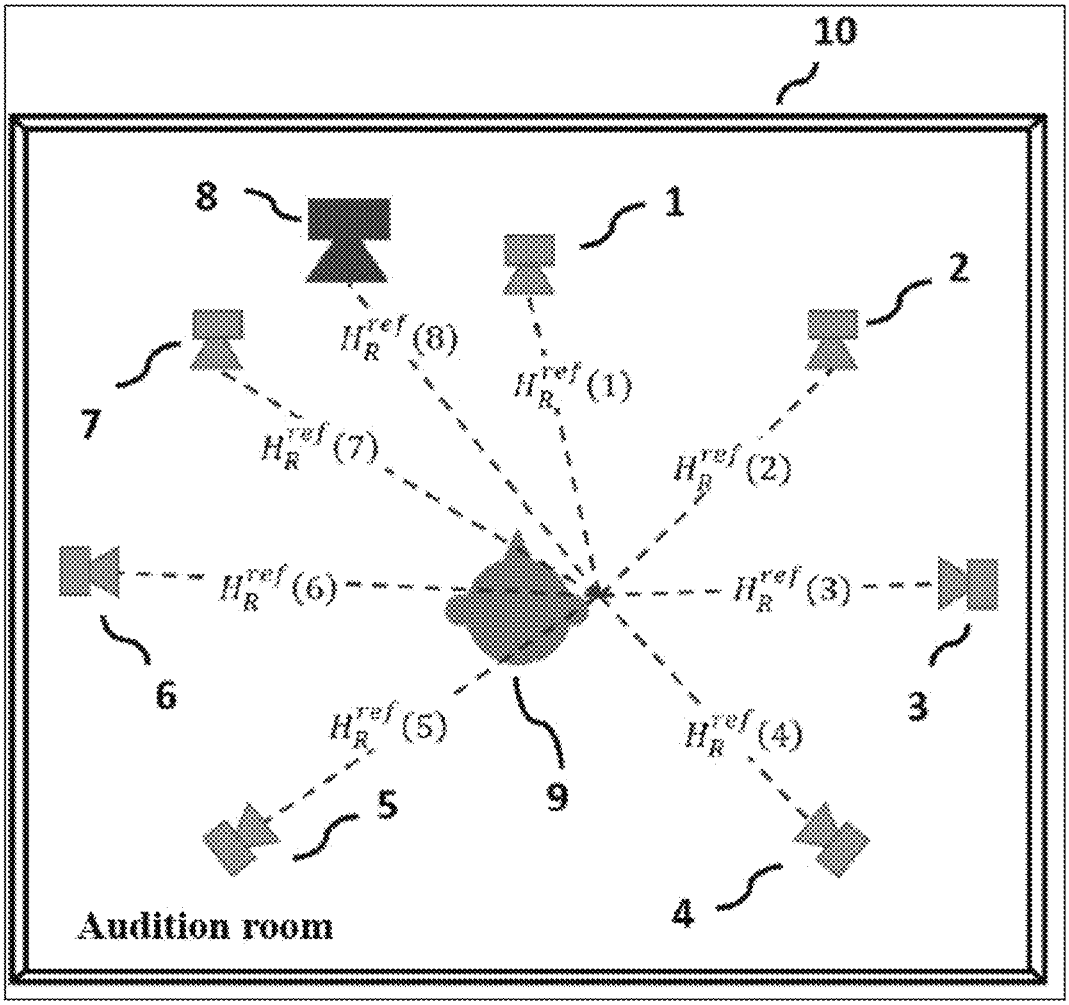
FIG. 3 is a diagram showing relative location relationships between a right ear of the target user and the speaker groups in the reference acoustic environment according to the first embodiment of the present disclosure.

Exemplarily, in this embodiment, a plurality of speaker groups may be provided in the reference acoustic environment. Thereby, a reference acoustic environment of a 7.1 channel system as shown in FIGS. 2 and 3 may be constructed, where the speaker groups include a speaker group 1, a speaker group 2, a speaker group 3, a speaker group 4, a speaker group 5, a speaker group 6, a speaker group 7, and a speaker group 8. Each speaker group may be a single speaker, or a module formed by multiple speakers. A target user 9 is located in a standard audition room and is in the center or best listening position of the 7.1 channel system. The target user 9 is located in a standard audition room in the center of the 7.1-channel system or in the best listening position. By modeling the auditory characteristics of the target user 9 in the reference acoustic environment, an acoustic signal matrix corresponding to the left ear of the target user 9 and an acoustic signal matrix corresponding to the right car of the target user 9 are constructed, and then the ideal auditory model in the reference acoustic environment can be obtained.

Figure 4:
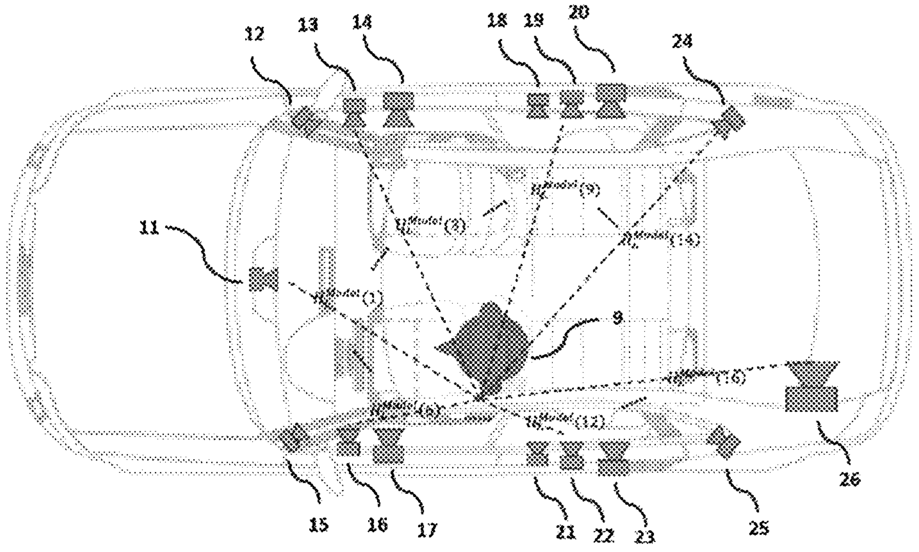
FIG. 4 is a diagram showing relative location relationships between a left ear of a target user and speaker groups in an in-vehicle acoustic environment according to the first embodiment of the present disclosure.
Figure 5:
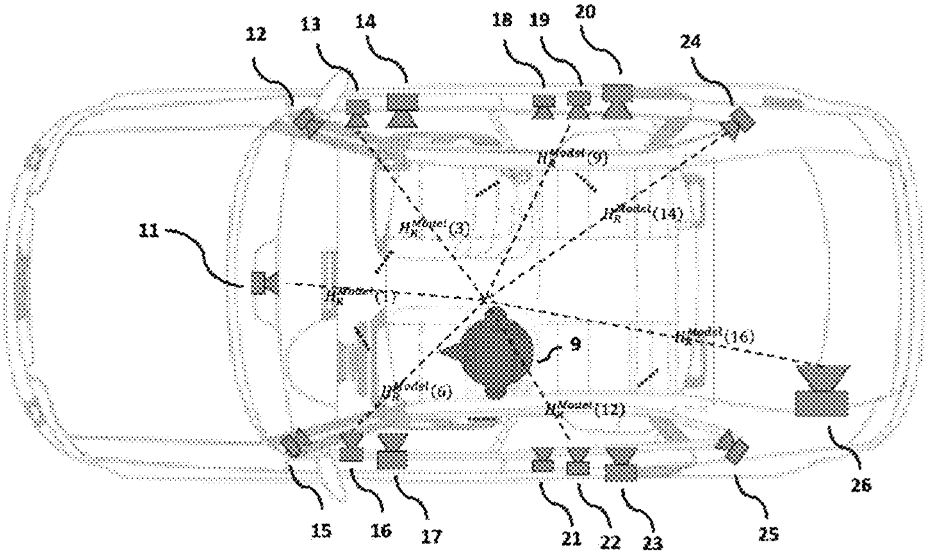
FIG. 5 is a diagram showing relative location relationships of a right ear of the target user and the speaker groups in the in-vehicle acoustic environment according to the first embodiment of the present disclosure.

Exemplarily, in this embodiment, the in-vehicle sound system may be an in-vehicle sound system including 16 speakers, and the listening experience of the target user 9 in the in-vehicle audio environment can be reconstructed to obtain a desired initial auditory model. As shown in FIGS. 4 and 5, the target speakers of the in-vehicle sound system may include: a speaker 11 located at a center position of a center console, a speaker 15 and a speaker 12 located at left and right A-pillars respectively, a speaker 16 and a speaker 17 located at a front left door, a speaker 13 and a speaker 14 located at a front right door, a speaker 21, a speaker 22 and a speaker 23 at a rear left door, a speaker 18, a speaker 19 and a speaker 20 at a rear right door, a speaker 25 and a speaker 24 at left and right C-pillars respectively, and a speaker 26 at a trunk. By modeling the auditory characteristics of the target user 9 in the in-vehicle acoustic environment, an acoustic signal matrix corresponding to the left ear of target user 9 and an acoustic signal matrix corresponding to the right ear of target user 9 are constructed, and then the auditory model in the in-vehicle acoustic environment can be obtained.

Further, in some implementations of this embodiment, before acquiring the initial auditory model of the target user in the in-vehicle audio environment and the ideal auditory model of the target user in the reference audio environment, the method further includes: acquiring, in the in-vehicle acoustic environment, a first acoustic transfer function of each respective target speaker of the target speakers to a target listening position, and a first electroacoustic conversion transfer function of the respective target speaker, where the first acoustic transfer function represents acoustic-physiological properties of the target user in the in-vehicle acoustic environment, and the first electroacoustic conversion transfer function represents software transfer characteristics and hardware transfer characteristics of the respective target speaker; and constructing the initial auditory model of the target user in the in-vehicle acoustic environment based on the first acoustic transfer function and first electroacoustic conversion transfer function.

Specifically, the auditory model of the target user 9 in the in-vehicle acoustic environment may be described by an acoustic signal matrix $$S^{model}_{@L\_Ear}$$

corresponding to the left ear of the target user 9 and an acoustic signal matrix $$S^{model}_{@R\_Ear}$$

corresponding to the right ear of the target user 9 as below.

$$\begin{cases} S^{model}_{@L\_Ear} = \begin{bmatrix} CH^{model}_{@L\_Ear}(1) \\ CH^{model}_{@L\_Ear}(2) \\ \vdots \\ CH^{model}_{@L\_Ear}(N) \end{bmatrix} \\ S^{model}_{@R\_Ear} = \begin{bmatrix} CH^{model}_{@R\_Ear}(1) \\ CH^{model}_{@R\_Ear}(2) \\ \vdots \\ CH^{model}_{@R\_Ear}(N) \end{bmatrix} \end{cases}$$

N denotes a number of original sound source channels in the reference acoustic environment, and N=8 in the 7.1 channel system, N=2 in the stereophonic system, N=6 in the 5.1 channel system, and N=12 in the 7.1.4 channel system, to name but a few.

$$CH^{model}_{@L_{Ear}}()$$

denotes an acoustic signal received by the target user's left ear, and $$CH^{model}_{@R_{Ear}}()$$

denotes an acoustic signal received by the target user's right ear. For the original sound source channels in the reference audio environment, there exists n E [1, N], where n is a natural number greater than or equal to 1. Correspondingly, $$CH^{model}_{@L\_Ear}(n)$$

denotes an ac acoustic signal of an n-th acoustic channel received by the left ear of the target user 9, and $$CH^{model}_{@R\_Ear}(n)$$

denotes an acoustic signal of the n-th acoustic channel received by the right ear of the target user 9. In the acoustic environment, one speaker group (speaker) corresponds to one acoustic channel, and 1≤n≤N.

Further, parameters of the acoustic signals in the initial auditory model may be refined as:

$$\begin{cases} CH^{model}_{@L\_Ear}(1) = CH(1)\Sigma^{M}_{m=1}a_1(m)\cdot H^{Model}_{L}(m)\cdot T^{Model}_{speaker}(m)\cdot T^{Model}_{DSP}(m) \\ CH^{model}_{@L\_Ear}(2) = CH(2)\Sigma^{M}_{m=1}a_2(m)\cdot H^{Model}_{L}(m)\cdot T^{Model}_{speaker}(m)\cdot T^{Model}_{DSP}(m) \\ \vdots \\ CH^{model}_{@L\_Ear}(N) = CH(N)\Sigma^{M}_{m=1}a_N(m)\cdot H^{Model}_{L}(m)\cdot T^{Model}_{speaker}(m)\cdot T^{Model}_{DSP}(m) \end{cases},$$

and $$\begin{cases} CH^{model}_{@R\_Ear}(1) = CH(1)\Sigma^{M}_{m=1}a_1(m)\cdot H^{Model}_{R}(m)\cdot T^{Model}_{speaker}(m)\cdot T^{Model}_{DSP}(m) \\ CH^{model}_{@R\_Ear}(2) = CH(2)\Sigma^{M}_{m=1}a_2(m)\cdot H^{Model}_{R}(m)\cdot T^{Model}_{speaker}(m)\cdot T^{Model}_{DSP}(m) \\ \vdots \\ CH^{model}_{@R\_Ear}(N) = CH(N)\Sigma^{M}_{m=1}a_N(m)\cdot H^{Model}_{R}(m)\cdot T^{Model}_{speaker}(m)\cdot T^{Model}_{DSP}(m) \end{cases}.$$

M denotes a number of target channels corresponding to the target speakers in the in-vehicle acoustic environment. In the in-vehicle acoustic environment, one target speaker corresponds to one target channel, and in this embodiment, M=16. N denotes a number of original sound source channels in the reference acoustic environment, and in this embodiment, N=8, and CH(n) denotes an original sound source signal of the n-th channel in the reference acoustic environment. For the target channels in the in-vehicle acoustic environment, there exists $m\in[1, M]$, where m is a natural number greater than or equal to 1.

$$H_L^{Model}(m)$$

denotes a first acoustic transfer function of an m-th target speaker to the left ear of the target user 9, and accordingly, $$H_L^{Model}(1)\sim H_L^{Model}(16)$$

denote first acoustic transfer functions of speakers 11 to 26 to the left ear of the target user 9 respectively, which are determined by the in-vehicle acoustic environment and the target user 9 and can be directly obtained by measurement.

$$H_R^{Model}(m)$$

denotes a first acoustic transfer function of the m-th target speaker to the right ear of the target user 9, and accordingly, $$H_R^{Model}(1)\sim H_R^{Model}(16)$$

denote first acoustic transfer functions from the speakers 11 to 26 to the right ear of the target user 9 respectively, which are determined by the in-vehicle acoustic environment and the target user 9 and can be directly obtained by measurement.

$$T_{speaker}^{Model}(m)$$

denotes a first electroacoustic conversion transfer function of the m-th target speaker, and accordingly, $$T_{speaker}^{Model}(1)\sim T_{speaker}^{Model}(16)$$

denote first electroacoustic conversion transfer functions of the speakers 11 to 26 respectively, which are determined by the physical characteristics of the speakers themselves and can be directly obtained by measurement.

$$T_{DSP}^{Model}(m)$$

denotes a digital tilter transfer function applied to the m-th target speaker of the in-vehicle sound system and configured to adjust characteristics of an original signal such as amplitude, phase, delay and frequency. $a_n(m)$ denotes an enablement judgement parameter of a speaker, i.e., being configured to judge whether or not it is necessary to enable a speaker corresponding to the m-th channel, and then to perform reconfiguration computation of the n-th channel of original sound sources in the reference acoustic environment.

$$a_n(m) = \begin{cases} 1 \\ 0 \end{cases}$$

In response to $a_n(m)=1$, it indicates that the speaker corresponding to the m-th channel needs to be enabled, and in response to $a_n(m)=0$, it indicates that the speaker corresponding to the m-th channel does not need to be enabled. In the specific implementation, the value of $a_n(m)$ may be determined by the developer according to the actual situation, which is not limited herein.

In some implementations of this embodiment, before acquiring the initial auditory model of the target user in the in-vehicle audio environment and the ideal auditory model of the target user in the reference audio environment, the method further includes: acquiring, in the reference acoustic environment, a second acoustic transfer function of each respective speaker group of the speaker groups to an ideal listening position where the target user is located, and a second electroacoustic conversion transfer function of the respective speaker group, where the second acoustic transfer function represents acoustic-physiological characteristics of the target user in the reference acoustic environment, and the second electroacoustic conversion transfer function represents software transfer characteristics and hardware transfer characteristics of the respective speaker group; and constructing the ideal auditory model of the target user in the reference acoustic environment based on the second acoustic transfer function and the second electroacoustic conversion transfer function.

Specifically, in this embodiment, the transfer function refers to a ratio of the Laplace transform (or z-transform) of a response quantity (i.e., an output quantity) to the Laplace transform of an excitation (i.e., an input quantity) of a linear system under zero initial conditions, and is denoted as H=Y|U, where Y and U are the Laplace transforms of the output quantity and the input quantity respectively. The auditory model in the reference acoustic environment may be expressed as:

$$\begin{cases} S_{@L\_Ear}^{ref} = \begin{bmatrix} CH_{@L\_Ear}^{ref}(1) \\ CH_{@L\_Ear}^{ref}(2) \\ \vdots \\ CH_{@L\_Ear}^{ref}(N) \end{bmatrix} = \begin{bmatrix} H_L^{ref}(1)\cdot CH(1)\cdot T^{ref}(1) \\ H_L^{ref}(2)\cdot CH(2)\cdot T^{ref}(2) \\ \vdots \\ H_L^{ref}(N)\cdot CH(N)\cdot T^{ref}(N) \end{bmatrix} \\ S_{@R\_Ear}^{ref} = \begin{bmatrix} CH_{@R\_Ear}^{ref}(1) \\ CH_{@R\_Ear}^{ref}(1) \\ \vdots \\ CH_{@R\_Ear}^{ref}(1) \end{bmatrix} = \begin{bmatrix} H_R^{ref}(1)\cdot CH(1)\cdot T^{ref}(1) \\ H_R^{ref}(2)\cdot CH(2)\cdot T^{ref}(2) \\ \vdots \\ H_R^{ref}(N)\cdot CH(N)\cdot T^{ref}(N) \end{bmatrix} \end{cases}.$$

$$S_{@L\_Ear}^{ref}$$

denotes an acoustic signal matrix corresponding to the left ear of the target user 9 in the reference acoustic environment, and $$S^{ref}_{@R\_Ear}$$

denotes an acoustic signal matrix corresponding to the right ear of the target user 9 in the reference acoustic environment. N denotes a number of sound source channels of the speaker system, and it can be understood that N=8 in the 7.1 channel system, N=2 in the stereophonic system, N=6 in the 5.1 channel system, and N=12 in the 7.1.4 channel system, to name but a few. In this embodiment, N=8, and $n \in [1, N]$.

$$CH^{ref}_{@L_{Ear}}(\,)$$

denotes an acoustic signal received by the left ear of the target user 9, and accordingly, $$CH^{ref}_{@L\_Ear}(n)$$

denotes an acoustic signal of the n-th channel received by the left ear of the target user 9.

$$CH^{ref}_{@R_{Ear}}(\,)$$

denotes an acoustic signal received by the right ear of the target user 9, and accordingly, $$CH^{ref}_{@R\_Ear}(n)$$

denotes an acoustic signal of the n-th channel received by the right ear of the target user 9. CH( ) denotes an original source signal in the reference acoustic environment, and accordingly, and CH(n) denotes an original acoustic signal of the n-th channel of the speaker system in the reference acoustic environment.

$$H^{ref}_{L}(\,)$$

denotes the second acoustic transfer function of a target speaker group to the left ear of the target user 9, $$H^{ref}_{R}(\,)$$

denotes the second acoustic transfer function of the target speaker group to the $$H^{ref}_{L}(n) \text{ and } H^{ref}_{R}(n)$$

acoustic transfer functions of the n-th speaker group to the left and right ears of the target user 9 respectively, which are determined by the audition room 10 and the target user 9 and can be obtained directly by measurement. $T^{ref}(\,)$ denotes the second electroacoustic conversion transfer function of the target speaker group, and correspondingly, $T^{ref}(n)$ denotes a second electroacoustic conversion transfer function of the n-th speaker group.

Further, in some implementations of this embodiment, the above operation of acquiring, in the reference acoustic environment, the second acoustic transfer function of each respective speaker group of the speaker groups to the ideal listening position where the target user is located includes: acquiring sound data returned by a microphone fixed at an ear position of the target user after the respective speaker group outputs a corresponding first test signal, where the ear position of the target user is the ideal listening position of the target user in the reference acoustic environment; and generating the second acoustic transfer function of the respective speaker group to the ear position of the target user in the reference acoustic environment based on the sound data.

Figure 6:
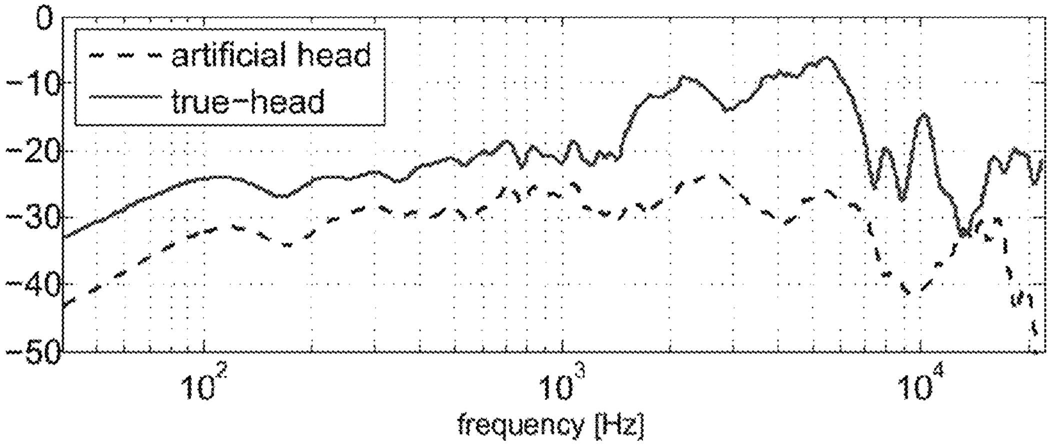
FIG. 6 is a diagram showing measuring results between a standardized artificial head and a true head of a user in the related art.

Specifically, in measuring, an in-ear microphone may be installed in the ear of the target user 9, and the measurement is performed at the center position or the optimal listening position, so that measurement results of $$H^{ref}_{L}(n) \text{ and } H^{ref}_{R}(n)$$

are fully consistent with the acoustic physiological characteristics of the target user 9. It should be noted that the acquisition of the traditional acoustic transfer function usually needs to be derived by comparing a measurement result in a standardized artificial head with a measurement result in a real user, and as shown in FIG. 6, the measurement result obtained by modeling with the standardized artificial head do not completely and accurately describe the auditory characteristics of a real user, thus failing to achieve the customization of the user's auditory effect. In contrast, in this embodiment, the measurement is performed with the in-ear microphone, which can more accurately obtain the acoustic transfer function that conforms to the acoustic-physiological characteristics of the target user.

In this embodiment, the electroacoustic conversion transfer function includes a hardware transfer characteristic component and a software transfer characteristic component of the speaker group, and the second electroacoustic conversion transfer function $T^{ref}(n)$ is denoted as:

$$T^{ref}(n) = T^{ref}_{speaker}(n) \cdot T^{ref}_{DSP}(n).$$

$$T^{ref}_{speaker}(n)$$

denotes the above hardware transfer characteristic component, which is determined by the physical characteristics of the speaker group and can be obtained directly through measurement.

$$T^{ref}_{DSP}(n)$$

denotes the above software transfer characteristic component, which is determined by an audio software algorithm applied to the respective speaker group or a digital filter of the respective speaker group, and configured to adjust characteristics of an original sound source signal, including, but not limited to amplitude, phase, delay and frequency of the original sound source signal.

Further, in some implementations of this embodiment, the above operation of obtaining the second electroacoustic conversion transfer function of the respective speaker group includes: after the respective speaker group outputs a corresponding second test signal, in response to a completion instruction of a debugging operation on the respective speaker group by the target user, determining an electroacoustic conversion transfer function of the respective speaker group after completion of the debugging operation to be the second electroacoustic conversion transfer function, where the debugging operation is configured for adjustment of the second electroacoustic conversion transfer function of the target speaker group so that the sound quality of the speaker group conforms to the listening preference of the target user.

Specifically, in this embodiment, the debugging operation includes hardware selection and software processing. Both the hardware selection of $$T_{speaker}^{ref}(n)$$

and the software processing of $$T_{DSP}^{ref}(n)$$

should sufficiently conform to the subjective listening preference of the target user 9. By designing and acoustically debugging the whole system, the subjective sound quality of the whole speaker system is made to sufficiently conform to the target user 9's listening style and tonality to achieve sound customization.

In some implementations, since the establishment of the auditory model is independent of input signals of original sound sources, to facilitate the calculation of the fitting process, the above ideal auditory model may be simplified as:

$$\begin{cases} S_{@L\_Ear}^{ref} = \begin{bmatrix} CH_{@L\_Ear}^{ref}(1) \\ CH_{@L\_Ear}^{ref}(2) \\ \vdots \\ CH_{@L\_Ear}^{ref}(N) \end{bmatrix} = CH_{Original} \cdot \begin{bmatrix} H_L^{ref}(1) \cdot T^{ref}(1) \\ H_L^{ref}(2) \cdot T^{ref}(2) \\ \vdots \\ H_L^{ref}(N) \cdot T^{ref}(N) \end{bmatrix} \\ S_{@R\_Ear}^{ref} = \begin{bmatrix} CH_{@R\_Ear}^{ref}(1) \\ CH_{@R\_Ear}^{ref}(2) \\ \vdots \\ CH_{@R\_Ear}^{ref}(N) \end{bmatrix} = CH_{Original} \cdot \begin{bmatrix} H_R^{ref}(1) \cdot T_{ref}(1) \\ H_R^{ref}(2) \cdot T_{ref}(2) \\ \vdots \\ H_R^{ref}(N) \cdot T^{ref}(N) \end{bmatrix} \end{cases}.$$

$CH_{Original}$ denotes a signal matrix of the original sound sources that is a diagonal matrix in which an element on the diagonal is an input channel signal of each of the original sound sources, and the remaining elements are zero. The signal matrix can be expressed as:

$$CH_{Original} = \begin{bmatrix} CH(1) & \cdots & 0 \\ \vdots & \ddots & \vdots \\ 0 & \cdots & CH(N) \end{bmatrix}.$$

In operation 102, the ideal auditory model and the initial auditory model are fitted based on predetermined fitting constraints to obtain target acoustic characteristic parameters corresponding to an acoustic signal output by each respective target speaker of the plurality of target speakers.

Specifically, the acoustic characteristic parameters include amplitude, phase, delay, frequency and the like of the acoustic signal. Fitting of the auditory models means to make sounds received by the target user in the in-vehicle acoustic environment and the reference acoustic environment have the same physical index, i.e., to make the target user in the in-vehicle acoustic environment have the same listening experience as in the reference acoustic environment.

Further, in some implementations of the present embodiment, the operation of fitting the ideal auditory model and the initial auditory model based on predetermined fitting constraints to obtain the target acoustic characteristic parameters corresponding to the acoustic signal output by each respective target speaker of the plurality of target speakers includes: fitting the ideal auditory model and the initial auditory model to obtain a difference calculation model of the acoustic signal, finding an optimal solution of the difference calculation model based on the preset fitting constraints, and determining the optimal solution as the target acoustic characteristic parameters corresponding to the acoustic signal output by the respective target speaker.

Specifically, the difference calculation model can be configured to characterize the difference between acoustic signals received by the target user in the reference acoustic environment and acoustic signals received in the in-vehicle acoustic environment. In addition, the difference calculation model may also be configured to evaluate a difference between the acoustic signals received by two ears of the target user in the same acoustic environment.

Further, in some implementations of the present embodiment, the difference calculation model includes a first difference calculation formula, a second difference calculation formula, and a third difference calculation formula. The first difference calculation formula is configured to calculate a difference between target acoustic characteristic parameters of an acoustic signal received by the target user in the in-vehicle acoustic environment and reference acoustic characteristic parameters of an ideal acoustic signal received by the target user in the reference acoustic environment. The second difference calculation formula is configured to calculate a binaural hearing difference index of the target user when an acoustic signal output from the same target speaker is applied to the target user in the in-vehicle acoustic environment. The third difference calculation formula is configured to calculate a binaural hearing difference index of the target user when an acoustic signal output from the same speaker group is applied to the target user in the reference acoustic environment. Accordingly, the above operation of finding the optimal solution of the difference calculation model based on the preset fitting constraints and determining the optimal solution as the target acoustic characteristic parameters corresponding to the acoustic signal output by the respective target speaker includes: finding the optimal solution of the difference calculation model based on a first fitting constraint and a second fitting constraint, where the first fitting constraint is that a result of the first difference calculation formula is zero, and the second fitting constraint is that a calculation result of the second difference calculation formula is equal to a calculation result of the third difference calculation formula; and determining the optimal solution as the target acoustic characteristic parameters corresponding to the acoustic signal output by the respective target speaker.

In an embodiment, the first difference calculation formula is expressed as:

$$\begin{cases} S^{ref}_{@L\_Ear} - S^{model}_{@L\_Ear} = \left[ \Delta A_L(1)e^{j\Delta\Phi_L(1)} \;\; \Delta A_L(2)e^{j\Delta\Phi_L(2)} \;\; \cdots \;\; \Delta A_L(N)e^{j\Delta\Phi_L(N)} \right] \\ s \\ S^{ref}_{@R\_Ear} - S^{model}_{@R\_Ear} = \left[ \Delta A_R(1)e^{j\Delta\Phi_R(1)} \;\; \Delta A_R(2)e^{j\Delta\Phi_R(2)} \;\; \cdots \;\; \Delta A_R(N)e^{j\Delta\Phi_R(N)} \right] \end{cases}.$$

N denotes a number of original sound source channels in the reference acoustic environment. For the original sound source channels in the reference acoustic environment, there exists n∈[1, N], and n is a natural number greater than or equal to 1. $\Delta A_L(n)$ denotes a difference in amplitude between an acoustic signal of the n-th channel received by the left ear of the target user in the reference acoustic environment and an acoustic signal of the n-th channel received by the left ear of the target user in the in-vehicle acoustic environment. $\Delta\Phi_L(n)$ denotes a difference in phase between the acoustic signal of the n-th channel received by the left ear of the target user in the reference acoustic environment and the acoustic signal of the n-th channel received by the left ear of the target user in the in-vehicle acoustic environment. $\Delta A_R(n)$ denotes a difference in amplitude between an acoustic signal of the n-th channel received by the right ear of the target user in the reference acoustic environment and an acoustic signal of the n-th channel received by the right ear of the target user in the in-vehicle acoustic environment. $\Delta\Phi_R(n)$ denotes a difference in phase between the acoustic signal of the n-th channel received by the right ear of the target user in the reference acoustic environment and the acoustic signal of the n-th channel received by the right ear of the target user in the in-vehicle acoustic environment. e denotes a natural constant, and j is an imaginary number.

In this embodiment, the binaural hearing difference index includes a binaural sound level difference, a binaural time difference, and the like. The binaural hearing difference of the target user in the same acoustic environment may be calculated by the second difference calculation formula and the third difference calculation formula. The third difference calculation formula may be expressed as:

$$S^{ref}_{@L\_Ear} - S^{ref}_{@R\_Ear} = \left[ \left(ILD^{ref}_1, ITD^{ref}_1\right) \;\; \left(ILD^{ref}_2, ITD^{ref}_2\right) \;\; \cdots \;\; \left(ILD^{ref}_N, ITD^{ref}_N\right) \right].$$

The second difference calculation formula may be expressed as:

$$S^{model}_{@L\_Ear} - S^{model}_{@R\_Ear} = \left[ \left(ILD^{model}_1, ITD^{model}_1\right) \;\; \left(ILD^{model}_2, ITD^{model}_2\right) \;\; \cdots \;\; \left(ILD^{model}_N, ITD^{model}_N\right) \right].$$

$$ILD^{ref}_n$$

denotes a binaural sound level difference of the acoustic signal of the n-th acoustic channel received by the target user 9 in the reference acoustic environment, where the binaural sound level difference is configured to reflect a difference in intensity between sounds received by two ears.

$$ITD^{ref}_n$$

denotes a binaural time difference of the acoustic signal of the n-th acoustic channel received by the target user 9 in the reference acoustic environment.

$$ILD^{model}_n$$

denotes a binaural sound level difference of the acoustic signal of the n-th acoustic channel received by the target user 9 in the reference acoustic environment.

$$ILD^{model}_n$$

denotes a binaural sound level difference of the acoustic signal of the n-th acoustic channel received by the target user 9 in the in-vehicle acoustic environment.

$$ITD^{model}_n$$

denotes a binaural time difference of the acoustic signal of the n-th acoustic channel received by the target user 9 in the in-vehicle acoustic environment.

Based on this, the above fitting constraints may be expressed by $$T^{Model}_{DSP}(m),$$

which can be expressed as:

$$\begin{cases} \Delta A_L(n) = 0 \\ \Delta\Phi_L(n) = 0 \\ \Delta A_R(n) = 0 \\ \Delta\Phi_R(n) = 0 \\ ILD^{ref}_n = ILD^{model}_n \\ ITD^{ref}_n = ITD^{model}_n \end{cases}.$$

The desired target acoustic transfer function can be obtained by finding the optimal solution of $T_{DSP}^{Model}(m)$.

In this embodiment, the above fitting process can be realized by a host integrated arithmetic module or an independent arithmetic module of an audio domain controller, which is not limited herein.

In operation 103, a target acoustic transfer function of the respective target speaker to the target user is acquired based on the target acoustic characteristic parameters, and the target acoustic transfer function is updated to a digital filter of the respective target speaker.

Specifically, the acoustic transfer function can describe the enhancement or attenuation characteristics of the system for sound waves of different frequencies. After updating the target acoustic transfer function to the respective target speaker, the amplitude, phase, delay, frequency and other parameters of an output signal of the respective target speaker can be adjusted based on the corresponding target acoustic transfer function, so that the audio output from the in-vehicle sound system fully conforms to the subjective listening preference of the target user, thus realizing sound customization.

Compared with the related art, the audio control method for the in-vehicle sound system provided in this embodiment includes: acquiring an initial auditory model of a target user in an in-vehicle acoustic environment and an ideal auditory model of the target user in a reference acoustic environment; fitting the ideal auditory model and the initial auditory model based on predetermined fitting constraints to obtain target acoustic characteristic parameters corresponding to an acoustic signal output by each respective target speaker of the plurality of target speakers; generating a target acoustic transfer function of the respective target speaker to the target user based on the target acoustic characteristic parameters, and updating the target acoustic transfer function to a corresponding digital filter of the target speaker.

In the present disclosure, by fitting calculation of the auditory model, the ideal auditory model of the user in the reference acoustic environment is simulated, and applied to the in-vehicle sound system, that is, the acoustic transfer function of each speaker in the in-vehicle sound system can be obtained through the fitting calculation of the auditory model, and then the corresponding speaker can be controlled by the acoustic transfer function, so that the audio emitted by the in-vehicle sound system can fully conforms to the user's listening preferences, and the user can enjoy specific listening experience and achieve personalized sound customization.

Figure 7:
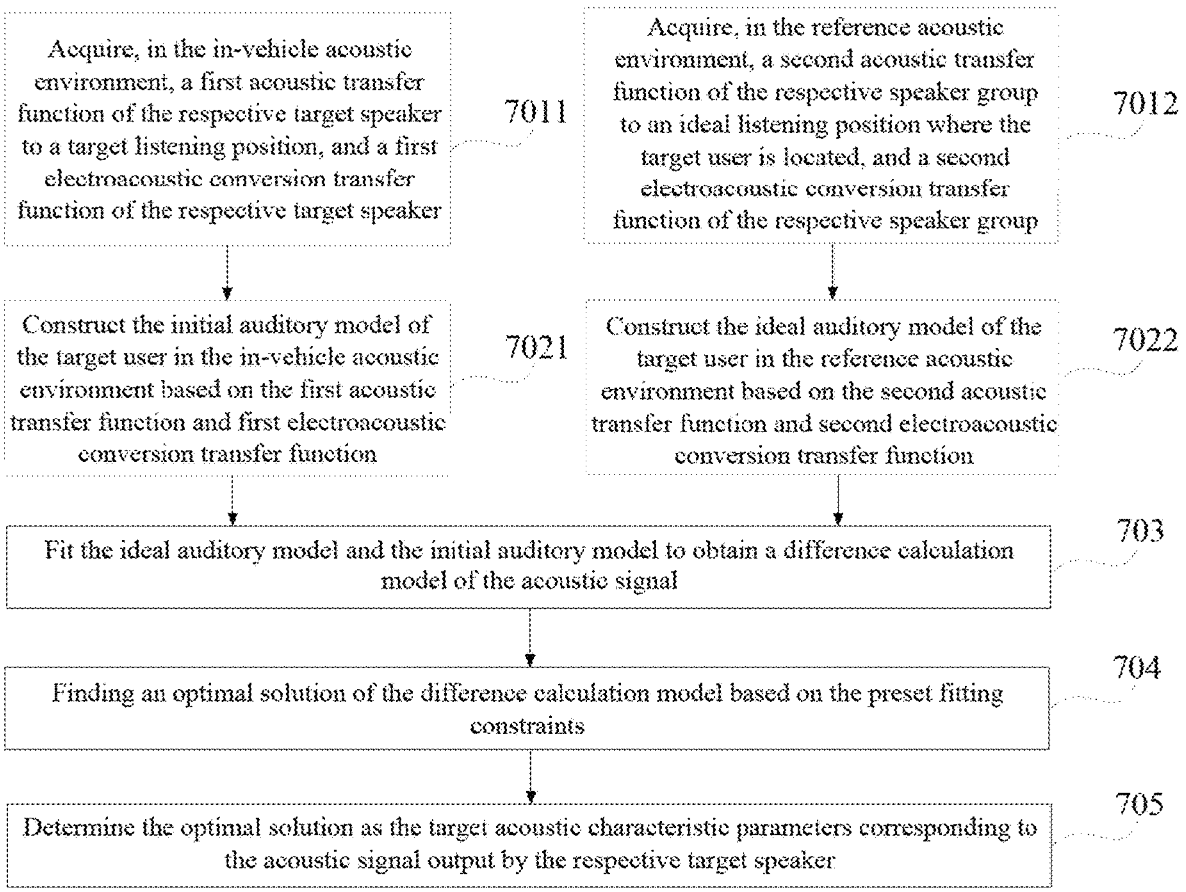
FIG. 7 is a refined flow chart of an audio control method for an in-vehicle sound system according to a second embodiment of the present disclosure.

A flowchart of a refined audio control method for an in-vehicle sound system according to a second embodiment of the present disclosure is shown in FIG. 7, where the in-vehicle sound system is configured with a plurality of target speakers, and the audio control method includes operations described below.

In operation 7011, a first acoustic transfer function of the respective target speaker to a target listening position and a first electroacoustic conversion transfer function of the respective target speaker in the in-vehicle acoustic environment are acquired.

In operation 7021, the initial auditory model of the target user in the in-vehicle acoustic environment is constructed based on the first acoustic transfer function and first electroacoustic conversion transfer function.

In operation 7012, a second acoustic transfer function of each respective speaker group of the plurality of speaker groups to an ideal listening position where the target user is located and a second electroacoustic conversion transfer function of the respective speaker group in the reference acoustic environment are acquired.

In operation 7022, the ideal auditory model of the target user in the reference acoustic environment is constructed based on the second acoustic transfer function and the second electroacoustic conversion transfer function.

In operation 703, the ideal auditory model and the initial auditory model are fitted to obtain a difference calculation model of the acoustic signal.

In operation 704, an optimal solution of the difference calculation model is found based on the preset fitting constraints.

In operation 705, the optimal solution is determined as the target acoustic characteristic parameters corresponding to the acoustic signal output by the respective target speaker.

It should be understood that the magnitude of the serial numbers of the operations in this embodiment does not imply an absolute sequential relationship of the order of execution of the operations, and the order of execution of the operations should be determined by functions and inherent logic of the operations without constituting a sole limitation on the implementation process of the embodiments of the present disclosure.

Compared with the related art, through the implementation of the audio control method provided in this embodiment, the auditory physiology difference and subjective listening preference difference between different individual users are fully taken into account, and the most adapted audio control scheme can be provided for different users, which greatly improves the user's sense of experience.

Figure 8:
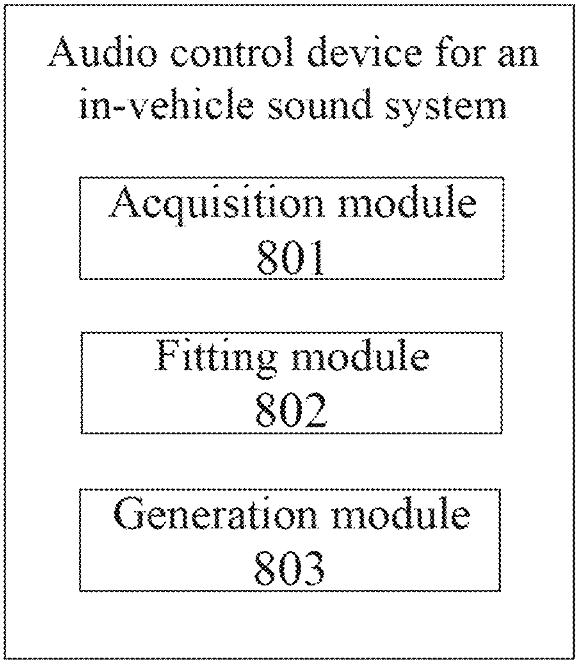
FIG. 8 is a schematic diagram showing program modules of an audio control device for an in-vehicle sound system according to a third embodiment of the present disclosure.

FIG. 8 is a schematic diagram showing program modules of an audio control device for an in-vehicle sound system according to a third embodiment of the present disclosure, where the in-vehicle sound system is configured with a plurality of target speakers. The audio control device for the in-vehicle sound system can be applied to the audio control method for the in-vehicle sound system as described. As shown in FIG. 8, the audio control device for the in-vehicle sound system mainly includes an acquisition module 801, a fitting module 802 and a generation module 803.

The acquisition module 801 is configured to acquire an initial auditory model of a target user in an in-vehicle acoustic environment and an ideal auditory model of the target user in a reference acoustic environment.

The fitting module 801 is configured to fit the ideal auditory model and the initial auditory model based on predetermined fitting constraints to obtain target acoustic characteristic parameters corresponding to an acoustic signal output by each respective target speaker of the plurality of target speakers.

The generation module 803 is configured to generate a target acoustic transfer function of the respective target speaker to the target user based on the target acoustic characteristic parameters and update the target acoustic transfer function to a digital filter of the respective target speaker.

In some implementations of this embodiment, the acquisition module is further configured to acquire, in the in-vehicle acoustic environment, a first acoustic transfer function of the respective target speaker to a target listening position and a first electroacoustic conversion transfer function of the respective target speaker and to construct the initial auditory model of the target user in the in-vehicle acoustic environment based on the first acoustic transfer function and first electroacoustic conversion transfer function, where the first acoustic transfer function represents acoustic-physiological properties of the target user in the in-vehicle acoustic environment, and the first electroacoustic conversion transfer function represents software transfer characteristics and hardware transfer characteristics of the respective target speaker.

In some implementations of this embodiment, a plurality of speaker groups are provided in the reference acoustic environment, and accordingly, the acquisition module is configured to acquire, in the reference acoustic environment, a second acoustic transfer function of each respective speaker group of the plurality of speaker groups to an ideal listening position where the target user is located and a second electroacoustic conversion transfer function of the respective speaker group, and to construct the ideal auditory model of the target user in the reference acoustic environment based on the second acoustic transfer function and the second electroacoustic conversion transfer function, where the second acoustic transfer function represents acoustic-physiological characteristics of the target user in the reference acoustic environment, and the second electroacoustic conversion transfer function represents software transfer characteristics and hardware transfer characteristics of the respective speaker group.

Further, in some implementations of this embodiment, in performing the above-described function of acquiring, in the reference acoustic environment, a second acoustic transfer function of each respective speaker group of the plurality of speaker groups to an ideal listening position where the target user is located, the acquisition module is specifically configured to acquire sound data returned by a microphone fixed at an car position of the target user after the respective speaker group outputs a corresponding first test signal, where the car position of the target user is the ideal listening position of the target user in the reference acoustic environment, and to generate the second acoustic transfer function of the respective speaker group to the car position of the target user in the reference acoustic environment based on the sound data.

Further, in some implementations of this embodiment, in performing the above-described function of acquiring the second electroacoustic conversion transfer function of the respective speaker group, the acquisition module is specifically configured to: after the respective speaker group outputs a corresponding second test signal, in response to a completion instruction of a debugging operation on the respective speaker group by the target user, determine an electroacoustic conversion transfer function of the respective speaker group after completion of the debugging operation as the second electroacoustic conversion transfer function, where the debugging operation is configured for adjustment of the second electroacoustic conversion transfer function of the respective target speaker group so that sound quality of the respective speaker group conforms to a listening preference of the target user.

In some implementations of the present embodiment, the fitting module is used to fit the ideal auditory model and the initial auditory model to obtain a difference calculation model of the acoustic signal, and to find an optimal solution of the difference calculation model based on the preset fitting constraints and determine the optimal solution as the target acoustic characteristic parameters corresponding to the acoustic signal output by the respective target speaker.

Further, in some implementations of this embodiment, the difference calculation model includes a first difference calculation formula, a second difference calculation formula, and a third difference calculation formula, where the first difference calculation formula is configured to calculate a difference between target acoustic characteristic parameters of an acoustic signal received by the target user in the in-vehicle acoustic environment and reference acoustic characteristic parameters of an ideal acoustic signal received by the target user in the reference acoustic environment; the second difference calculation formula is configured to calculate a binaural hearing difference index of the target user when an acoustic signal output from the same target speaker is applied to the target user in the in-vehicle acoustic environment; and the third difference calculation formula is configured to calculate a binaural hearing difference index of the target user when an acoustic signal output from the same speaker group is applied to the target user in the reference acoustic environment. Accordingly, in performing the above-described function of finding the optimal solution of the difference calculation model based on the preset fitting constraints and determining the optimal solution as the target acoustic characteristic parameters corresponding to the acoustic signal output by the respective target speaker, the fitting module is specifically configured to find the optimal solution of the difference calculation model based on a first fitting constraint and a second fitting constraint, where the first fitting constraint is that a result of the first difference calculation formula is zero, and the second fitting constraint is that a calculation result of the second difference calculation formula is equal to a calculation result of the third difference calculation formula; and to determine the optimal solution as the target acoustic characteristic parameters corresponding to the acoustic signal output by the respective target speaker.

In the audio control device for the in-vehicle sound system provided in this embodiment, an initial auditory model of a target user in an in-vehicle acoustic environment and an ideal auditory model of the target user in a reference acoustic environment are acquired; the ideal auditory model and the initial auditory model are fitted based on predetermined fitting constraints to obtain target acoustic characteristic parameters corresponding to an acoustic signal output by each respective target speaker of the plurality of target speakers; and a target acoustic transfer function of the respective target speaker to the target user is generated based on the target acoustic characteristic parameters, and the target acoustic transfer function is updated to a digital filter of the respective target speaker. In the present disclosure, the user's ideal auditory model in the reference acoustic environment is simulated through the fitting calculation of the auditory model, and applied to the in-vehicle sound system, i.e., the acoustic transfer function of each loudspeaker in the in-vehicle sound system is obtained by fitting the auditory model, and then the corresponding loudspeaker can be controlled by the acoustic transfer function, so that the audio emitted by the in-vehicle sound system can fully conforms to the user's listening preferences, and the user can enjoy specific listening experience and achieve personalized sound customization in the in-vehicle acoustic environment.

Figure 9:
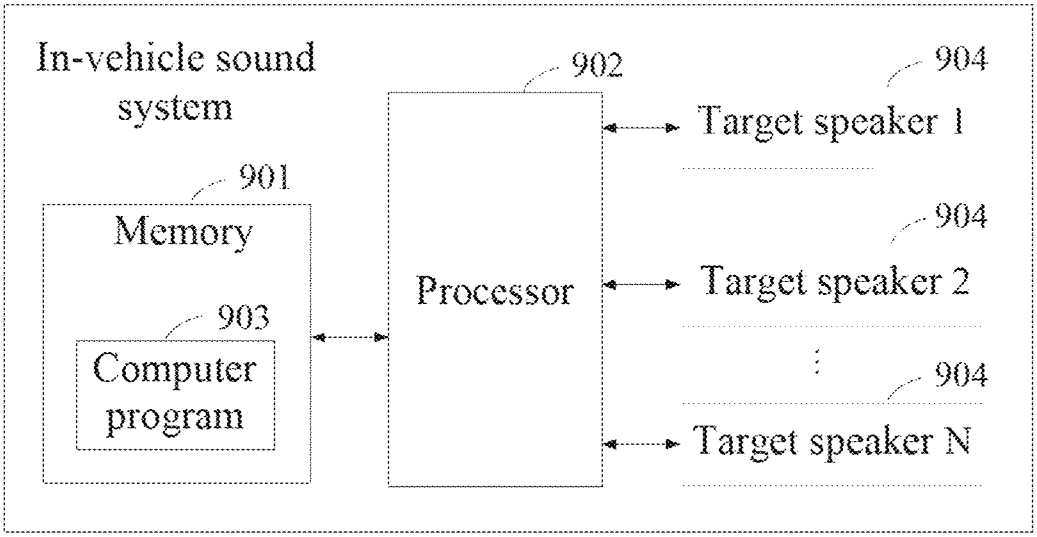
FIG. 9 is a schematic diagram of the structure of an in-vehicle sound system according to a fourth embodiment of the present disclosure.

FIG. 9 shows an in-vehicle sound system provided in a fourth embodiment of the present disclosure, which can be configured to implement the audio control method in the preceding embodiments. The in-vehicle sound system mainly includes: a memory 901, a processor 902, a computer program 903 stored in the memory 901 and executable on the processor 902, and a plurality of target speakers 904. Each target speaker 904 is communicatively connected to the processor 902 and configured to sound based on a corresponding target acoustic transfer function. The memory 901 and the processor 902 are communicatively coupled to each other. The processor 902 is configured to implement, when performing the computer program 903, the method in the preceding embodiments. The number of processors may be one or more.

The memory 901 may be a high-speed random access memory (RAM), or a non-volatile memory such as a disk memory. The memory 901 is configured to store executable program codes, and the processor 902 is coupled to the memory 901.

Further, embodiments of the present disclosure also provide a computer-readable storage medium, which may be disposed in the above-described in-vehicle sound system and may be the memory in the preceding embodiments shown in FIG. 9.

The computer-readable storage medium stores a computer program configured to implement, when executed by a processor, the audio control method in the preceding embodiments. Further, the computer-readable storage medium may include a USB flash drive, a removable hard disk, a ROM, a RAM, a diskette, a CD-ROM, or other media that can store program code.

In the several embodiments provided in the present disclosure, it should be understood that the devices and methods disclosed may be realized in other ways. For example, the above-described device embodiments are merely exemplary, e.g., the division of modules is merely a logical functional division, and may be divided in other ways when actually implemented. For example, multiple modules or components may be combined or may be integrated into another system, or some features may be ignored, or not implemented. At another point, the mutual coupling or direct coupling or communication connection shown or discussed may be implemented by some interfaces, and an indirect coupling or communication connection of devices or modules may be electrical, mechanical or otherwise.

The modules illustrated as separate components may or may not be physically separate, and the components shown as modules may or may not be physical modules, i.e., they may be located in a single place or they may be distributed to a plurality of network modules. Some or all of these modules may be selected to implement the embodiment schemes according to actual needs.

Furthermore, various functional modules in the various embodiments of the present disclosure may be integrated in a single processing module or physically present separately, or two or more modules may be integrated in a single module. The above integrated modules may be implemented in the form of either hardware or software function modules.

The integrated modules, when implemented in the form of software function modules and sold or used as separate products, may be stored in a computer readable storage medium. Based on this understanding, the technical solution of the present disclosure may be embodied in essence or as a contribution to the prior art, or in whole or in part, in the form of a software product, which is stored in a computer-readable storage medium and comprises a number of instructions to enable a computer device (which may be a personal computer, a server, or a network device, etc.) to perform all or part of the operations of the method in the embodiments of the present disclosure. The aforementioned readable storage medium includes a USB flash drive, a removable hard disk, a ROM, a RAM, a diskette, a CD-ROM, or other media that can store program code.

It is to be noted that the aforementioned method embodiments are expressed as a series of action combinations for the sake of simplicity of description, but the person skilled in the art should be aware that the present disclosure is not limited by the order of the described actions, since certain operations may be carried out in other orders or simultaneously according to the present disclosure. In addition, the person skilled in the art should also be aware that the embodiments described in the specification are all exemplary embodiments, and the actions and modules involved are not necessarily all necessary for the present disclosure.

In the above embodiments, the description of each embodiment has its own focus, and the part not detailed in a certain embodiment may be referred to the relevant description of other embodiments.

The above is a description of the audio control method, audio control device, and in-vehicle sound system in the present disclosure. For the person skilled in the art, based on the ideas of the embodiments of the present disclosure, changes may be made in the implementations and application scope, and in summary, the contents of this specification should not be construed as a limitation of the present disclosure.

What is claimed is:

1. An audio control method for an in-vehicle sound system, wherein the in-vehicle sound system is configured with a plurality of target speakers, and the audio control method comprises:

acquiring an initial auditory model of a target user in an in-vehicle acoustic environment and an ideal auditory model of the target user in a reference acoustic environment;

fitting the ideal auditory model and the initial auditory model based on predetermined fitting constraints to obtain target acoustic characteristic parameters corresponding to an acoustic signal output by each respective target speaker of the plurality of target speakers; and generating a target acoustic transfer function of the respective target speaker to the target user based on the target acoustic characteristic parameters, and updating the target acoustic transfer function to a digital filter of the respective target speaker.

2. The audio control method for the in-vehicle sound system according to claim 1, wherein before acquiring the initial auditory model of the target user in the in-vehicle acoustic environment and the ideal auditory model of the target user in the reference acoustic environment, the audio control method further comprises:

acquiring, in the in-vehicle acoustic environment, a first acoustic transfer function of the respective target speaker to a target listening position, and a first electroacoustic conversion transfer function of the respective target speaker, wherein the first acoustic transfer function represents acoustic-physiological properties of the target user in the in-vehicle acoustic environment, and the first electroacoustic conversion transfer function represents software transfer characteristics and hardware transfer characteristics of the respective target speaker; and constructing the initial auditory model of the target user in the in-vehicle acoustic environment based on the first acoustic transfer function and the first electroacoustic conversion transfer function.

3. The audio control method for the in-vehicle sound system according to claim 2, wherein the initial auditory model is expressed as:

$$\begin{cases} S^{model}_{@L\_Ear} = \begin{bmatrix} CH^{model}_{@L\_Ear}(1) \\ CH^{model}_{@L\_Ear}(2) \\ \vdots \\ CH^{model}_{@L\_Ear}(N) \end{bmatrix} \\ S^{model}_{@R\_Ear} = \begin{bmatrix} CH^{model}_{@L\_Ear}(1) \\ CH^{model}_{@L\_Ear}(2) \\ \vdots \\ CH^{model}_{@L\_Ear}(N) \end{bmatrix} \end{cases}, \text{ wherein}$$

$$S^{model}_{@L\_Ear}$$

denotes an acoustic signal matrix corresponding to a left ear of the target user in the in-vehicle acoustic environment, $$S^{model}_{@R\_Ear}$$

denotes an acoustic signal matrix corresponding to a right ear of the target user in the in-vehicle acoustic environment, N denotes a number of original sound source channels in the reference acoustic environment, $$CH^{model}_{@L_{Ear}}()$$

denotes an acoustic signal received by the left ear of the target user, and $$CH^{model}_{@R_{Ear}}()$$

denotes an acoustic signal received by the right ear of the target user.

4. The audio control method for the in-vehicle sound system according to claim 3, wherein the acoustic signal received by the left ear of the target user is expressed as:

$$\begin{cases} CH^{model}_{@L\_Ear}(1) = CH(1)\sum_{m=1}^{M} a_1(m)\cdot H^{Model}_{L}(m)\cdot T^{Model}_{speaker}(m)\cdot T^{Model}_{DSP}(m) \\ CH^{model}_{@L\_Ear}(2) = CH(2)\sum_{m=1}^{M} a_2(m)\cdot H^{Model}_{L}(m)\cdot T^{Model}_{speaker}(m)\cdot T^{Model}_{DSP}(m) \\ \vdots \\ CH^{model}_{@L\_Ear}(N) = CH(N)\sum_{m=1}^{M} a_N(m)\cdot H^{Model}_{L}(m)\cdot T^{Model}_{speaker}(m)\cdot T^{Model}_{DSP}(m) \end{cases}, \text{ and}$$

the acoustic signal received by the right ear of the target user is expressed as:

$$\begin{cases} CH^{model}_{@R\_Ear}(1) = CH(1)\sum_{m=1}^{M} a_1(m)\cdot H^{Model}_{R}(m)\cdot T^{Model}_{speaker}(m)\cdot T^{Model}_{DSP}(m) \\ CH^{model}_{@R\_Ear}(2) = CH(2)\sum_{m=1}^{M} a_2(m)\cdot H^{Model}_{R}(m)\cdot T^{Model}_{speaker}(m)\cdot T^{Model}_{DSP}(m) \\ \vdots \\ CH^{model}_{@R\_Ear}(N) = CH(N)\sum_{m=1}^{M} a_N(m)\cdot H^{Model}_{R}(m)\cdot T^{Model}_{speaker}(m)\cdot T^{Model}_{DSP}(m) \end{cases},$$

wherein M denotes a number of target channels in the in-vehicle acoustic environment, each of the plurality of target speakers corresponds to respective target channel of the target channels in the in-vehicle acoustic environment, CH(n) denotes an original sound source signal of an n-th channel in the reference acoustic environment, for the target channels in the in-vehicle acoustic environment, there exists m∈[1, M], wherein m is a natural number greater than or equal to 1, $$H^{Model}_{L}(m)$$

denotes the first acoustic transfer function of an m-th target speaker to the left ear of the target user, $$H^{Model}_{R}(m)$$

denotes the first acoustic transfer function of the m-th target speaker to the right ear of the target user, $$T^{Model}_{speaker}(m)$$

denotes the first electroacoustic conversion transfer function of the m-th target speaker, $$T^{Model}_{DSP}(m)$$

denotes a digital tilter transfer function applied to the m-th target speaker, and $a_n$(m) denotes an enablement judgement parameter corresponding to the m-th target speaker.

5. The audio control method for the in-vehicle sound system according to claim 1, wherein a plurality of speaker groups are provided in the reference acoustic environment, and a number of the plurality of speaker groups is equal to a number of the plurality of target speakers; and wherein before acquiring the initial auditory model of the target user in the in-vehicle audio environment and the ideal auditory model of the target user in the reference audio environment, the audio control method further comprises:

acquiring, in the reference acoustic environment, a second acoustic transfer function of each respective speaker group of the plurality of speaker groups to an ideal listening position where the target user is located, and a second electroacoustic conversion transfer function of the respective speaker group, wherein the second acoustic transfer function represents acoustic-physiological characteristics of the target user in the reference acoustic environment, and the second electroacoustic conversion transfer function represents software transfer characteristics and hardware transfer characteristics of the respective speaker group; and constructing the ideal auditory model of the target user in the reference acoustic environment based on the second acoustic transfer function and the second electroacoustic conversion transfer function.

6. The audio control method for the in-vehicle sound system according to claim 5, wherein the ideal auditory model is expressed as:

$$\begin{cases} S^{model}_{@L\_Ear} = \begin{bmatrix} CH^{model}_{@L\_Ear}(1) \\ CH^{model}_{@L\_Ear}(2) \\ \vdots \\ CH^{model}_{@L\_Ear}(N) \end{bmatrix} = \begin{bmatrix} H_L^{ref}(1)\cdot CH(1)\cdot T^{ref}(1) \\ H_L^{ref}(2)\cdot CH(2)\cdot T^{ref}(2) \\ \vdots \\ H_L^{ref}(N)\cdot CH(N)\cdot T^{ref}(N) \end{bmatrix} \\ S^{model}_{@R\_Ear} = \begin{bmatrix} CH^{model}_{@R\_Ear}(1) \\ CH^{model}_{@R\_Ear}(2) \\ \vdots \\ CH^{model}_{@R\_Ear}(N) \end{bmatrix} = \begin{bmatrix} H_R^{ref}(1)\cdot CH(1)\cdot T^{ref}(1) \\ H_R^{ref}(2)\cdot CH(2)\cdot T^{ref}(2) \\ \vdots \\ H_R^{ref}(N)\cdot CH(N)\cdot T^{ref}(N) \end{bmatrix} \end{cases}, \text{ wherein}$$

$$S^{ref}_{@L-Ear}$$

denotes an acoustic signal matrix corresponding to the left ear of the target user in the reference acoustic environment, and $$S^{ref}_{@R-Ear}$$

denotes an acoustic signal matrix corresponding to the right ear of the target user in the reference acoustic environment, N denotes a number of original sound source channels in the reference acoustic environment, $$CH^{ref}_{@L_{Ear}}()$$

denotes an acoustic signal received by the left ear of the target user, $$CH^{ref}_{@R_{Ear}}()$$

denotes an acoustic signal received by the right ear of the target user, CH( ) denotes an original source signal in the reference acoustic environment, and accordingly, $$H_L^{ref}()$$

denotes the second acoustic transfer function of a target speaker group to the left ear of the target user, $$H_R^{ref}()$$

denotes the second acoustic transfer function of the target speaker group to the right ear of the target user, and $T^{ref}(\ )$ denotes the second electroacoustic conversion transfer function of the target speaker group.

7. The audio control method for the in-vehicle sound system according to claim 5, wherein acquiring, in the reference acoustic environment, the second acoustic transfer function of each respective speaker group of the plurality of speaker groups to the ideal listening position where the target user is located includes:

acquiring sound data returned by a microphone fixed at an ear position of the target user after the respective speaker group outputs a corresponding first test signal, wherein the ear position of the target user is the ideal listening position of the target user in the reference acoustic environment; and generating the second acoustic transfer function of the respective speaker group to the ear position of the target user in the reference acoustic environment based on the sound data.

8. The audio control method for the in-vehicle sound system according to claim 5, wherein obtaining the second electroacoustic conversion transfer function of the respective speaker group includes:

after the respective speaker group outputs a corresponding second test signal, in response to a completion instruction of a debugging operation on the respective speaker group by the target user, determining an electroacoustic conversion transfer function of the respective speaker group after completion of the debugging operation as the second electroacoustic conversion transfer function, wherein the debugging operation is configured for adjustment of the second electroacoustic conversion transfer function of the respective target speaker group so that sound quality of the respective speaker group conforms to a listening preference of the target user.

9. The audio control method for the in-vehicle sound system according to claim 1, wherein fitting the ideal auditory model and the initial auditory model based on the predetermined fitting constraints to obtain the target acoustic characteristic parameters corresponding to the acoustic signal output by each respective target speaker of the plurality of target speakers includes:

fitting the ideal auditory model and the initial auditory model to obtain a difference calculation model of the acoustic signal; and finding an optimal solution of the difference calculation model based on the preset fitting constraints, and determining the optimal solution as the target acoustic characteristic parameters corresponding to the acoustic signal output by the respective target speaker.

10. The audio control method for the in-vehicle sound system according to claim 9, wherein the difference calculation model includes a first difference calculation formula, a second difference calculation formula, and a third difference calculation formula, wherein the first difference calculation formula is configured to calculate a difference between target acoustic characteristic parameters of an acoustic signal received by the target user in the in-vehicle acoustic environment and reference acoustic characteristic parameters of an ideal acoustic signal received by the target user in the reference acoustic environment, the second difference calculation formula is configured to calculate a binaural hearing difference index of the target user when an acoustic signal output from the same target speaker is applied to the target user in the in-vehicle acoustic environment, and the third difference calculation formula is configured to calculate a binaural hearing difference index of the target user when an acoustic signal output from the same speaker group is applied to the target user in the reference acoustic environment;

wherein finding the optimal solution of the difference calculation model based on the preset fitting constraints and determining the optimal solution as the target acoustic characteristic parameters corresponding to the acoustic signal output by the respective target speaker include:

finding the optimal solution of the difference calculation model based on a first fitting constraint and a second fitting constraint, wherein the first fitting constraint is that a result of the first difference calculation formula is zero, and the second fitting constraint is that a calculation result of the second difference calculation formula is equal to a calculation result of the third difference calculation formula; and determining the optimal solution as the target acoustic characteristic parameters corresponding to the acoustic signal output by the respective target speaker.

11. The audio control method for the in-vehicle sound system according to claim 10, wherein at least one of the following is included:

the first difference calculation formula is expressed as:

$$\begin{cases} S^{ref}_{@L\_Ear} - S^{model}_{@L\_Ear} = [\,\Delta A_L(1)e^{j\Delta\Phi_L(1)} \;\; \Delta A_L(2)e^{j\Delta\Phi_L(2)} \;\; \ldots \;\; \Delta A_L(N)e^{j\Delta\Phi_L(N)}\,] \\ \qquad\qquad\qquad\qquad s \qquad\qquad\qquad\qquad ; \\ S^{ref}_{@R\_Ear} - S^{model}_{@R\_Ear} = [\,\Delta A_R(1)e^{j\Delta\Phi_R(1)} \;\; \Delta A_R(2)e^{j\Delta\Phi_R(2)} \;\; \ldots \;\; \Delta A_R(N)e^{j\Delta\Phi_R(N)}\,] \end{cases}$$

the third difference calculation formula is expressed as:

$$S^{ref}_{@L_{Ear}} - S^{ref}_{@R_{Ear}} = [\,(ILD^{ref}_1, ITD^{ref}_1) \;\; (ILD^{ref}_2, ITD^{ref}_2) \;\; \ldots \;\; (ILD^{ref}_N, ITD^{ref}_N)\,];$$

and the second difference calculation formula is expressed as:

$$S^{model}_{@L\_Ear} - S^{model}_{@R\_Ear} = [\,(ILD^{model}_1, ITD^{model}_1) \;\; (ILD^{model}_2, ITD^{model}_2) \;\; \ldots \;\; (ILD^{model}_N, ITD^{model}_N)\,];$$

wherein $S^{ref}_{@L\_Ear}$ denotes an acoustic signal matrix corresponding to a left ear of the target user in the reference acoustic environment, $$S^{ref}_{@R\_Ear}$$

denotes an acoustic signal matrix corresponding to a right ear of the target user in the reference acoustic environment, $$S^{model}_{@L\_Ear}$$

denotes an acoustic signal matrix corresponding to the left ear of the target user in the in-vehicle acoustic environment, $$S^{model}_{@R\_Ear}$$

denotes an acoustic signal matrix corresponding to the right ear of the target user in the in-vehicle acoustic environment;

wherein N denotes a number of original sound source channels in the reference acoustic environment, for the original sound source channels in the reference acoustic environment, there exists $n \in [1, N]$, wherein n is a natural number greater than or equal to 1, $\Delta A_L(n)$ denotes a difference in amplitude between an acoustic signal of an n-th channel received by the left ear of the target user in the reference acoustic environment and an acoustic signal of an n-th channel received by the left ear of the target user in the in-vehicle acoustic environment, $\Delta\Phi_L(n)$ denotes a difference in phase between the acoustic signal of the n-th channel received by the left ear of the target user in the reference acoustic environment and the acoustic signal of the n-th channel received by the left ear of the target user in the in-vehicle acoustic environment, $\Delta A_R(n)$ denotes a difference in amplitude between an acoustic signal of an n-th channel received by the right ear of the target user in the reference acoustic environment and an acoustic signal of an n-th channel received by the right ear in the in-vehicle acoustic environment, $\Delta\Phi_R(n)$ denotes a difference in phase between the acoustic signal of the n-th channel received by the right ear of the target user in the reference acoustic environment and the acoustic signal of the n-th channel received by the right ear of the target user in the in-vehicle acoustic environment, e denotes a natural constant, and j is an imaginary number;

wherein $$ILD^{ref}_n$$

denotes a binaural sound level difference of the acoustic signal of the n-th acoustic channel received by the target user in the reference acoustic environment, $$ITD^{ref}_n$$

denotes a binaural time difference of the acoustic signal of the n-th acoustic channel received by the target user in the reference acoustic environment; and wherein $$ILD^{model}_n$$

denotes a binaural sound level difference of the acoustic signal of the n-th acoustic channel received by the target user in the in-vehicle acoustic environment, and $$ITD_n^{model}$$

denotes a binaural time difference of the acoustic signal of the n-th acoustic channel received by the target user in the in-vehicle acoustic environment.

12. An audio control device for an in-vehicle sound system, wherein the in-vehicle sound system is configured with a plurality of target speakers, and the audio control device comprises:

an acquisition module, configured to acquire an initial auditory model of a target user in an in-vehicle acoustic environment and an ideal auditory model of the target user in a reference acoustic environment;

a fitting module, configured to fit the ideal auditory model and the initial auditory model based on predetermined fitting constraints to obtain target acoustic characteristic parameters corresponding to an acoustic signal output by each respective target speaker of the plurality of target speakers; and a generation module, configured to generate a target acoustic transfer function of the respective target speaker to the target user based on the target acoustic characteristic parameters, and update the target acoustic transfer function to a digital filter of the respective target speaker.

13. An in-vehicle sound system, comprising a memory, a processor, and a plurality of target speakers, wherein:

each of the plurality of target speakers is configured to sound based on a corresponding target acoustic transfer function;

the processor is configured to execute a computer program stored on the memory; and the processor is configured to perform, when executing the computer programs, an audio control method including:

acquiring an initial auditory model of a target user in an in-vehicle acoustic environment and an ideal auditory model of the target user in a reference acoustic environment;

fitting the ideal auditory model and the initial auditory model based on predetermined fitting constraints to obtain target acoustic characteristic parameters corresponding to an acoustic signal output by each respective target speaker of the plurality of target speakers; and generating a target acoustic transfer function of the respective target speaker to the target user based on the target acoustic characteristic parameters, and updating the target acoustic transfer function to a digital filter of the respective target speaker.

14. The in-vehicle sound system according to claim 13, wherein before acquiring the initial auditory model of the target user in the in-vehicle acoustic environment and the ideal auditory model of the target user in the reference acoustic environment, the audio control method further comprises:

acquiring, in the in-vehicle acoustic environment, a first acoustic transfer function of the respective target speaker to a target listening position, and a first electroacoustic conversion transfer function of the respective target speaker, wherein the first acoustic transfer function represents acoustic-physiological properties of the target user in the in-vehicle acoustic environment, and the first electroacoustic conversion transfer function represents software transfer characteristics and hardware transfer characteristics of the respective target speaker; and constructing the initial auditory model of the target user in the in-vehicle acoustic environment based on the first acoustic transfer function and the first electroacoustic conversion transfer function.

15. The in-vehicle sound system according to claim 14, wherein the initial auditory model is expressed as:

$$\begin{cases} S_{@L\_Ear}^{model} = \begin{bmatrix} CH_{@L\_Ear}^{model}(1) \\ CH_{@L\_Ear}^{model}(2) \\ \vdots \\ CH_{@L\_Ear}^{model}(N) \end{bmatrix}, \\ S_{@R\_Ear}^{model} = \begin{bmatrix} CH_{@R\_Ear}^{model}(1) \\ CH_{@R\_Ear}^{model}(2) \\ \vdots \\ CH_{@R\_Ear}^{model}(N) \end{bmatrix} \end{cases}$$

wherein $S_{@L\_Ear}^{model}$ denotes an acoustic signal matrix corresponding to a left ear of the target user in the in-vehicle acoustic environment, $$S_{@R\_Ear}^{model}$$

denotes an acoustic signal matrix corresponding to a right ear of the target user in the in-vehicle acoustic environment, N denotes a number of original sound source channels in the reference acoustic environment, $$CH_{@L_{Ear}}^{model}()$$

denotes an acoustic signal received by the left ear of the target user, and $$CH_{@R_{Ear}}^{model}()$$

denotes an acoustic signal received by the right ear of the target user.

16. The audio control method for the in-vehicle sound system according to claim 15, wherein the acoustic signal received by the left ear of the target user is expressed as:

$$\begin{cases} CH_{@L\_Ear}^{model}(1) = CH(1)\sum_{m=1}^{M} a_1(m)\cdot H_L^{Model}(m)\cdot T_{speaker}^{Model}(m)\cdot T_{DSP}^{Model}(m) \\ CH_{@L\_Ear}^{model}(2) = CH(2)\sum_{m=1}^{M} a_2(m)\cdot H_L^{Model}(m)\cdot T_{speaker}^{Model}(m)\cdot T_{DSP}^{Model}(m) \\ \vdots \\ CH_{@L\_Ear}^{model}(N) = CH(N)\sum_{m=1}^{M} a_N(m)\cdot H_L^{Model}(m)\cdot T_{speaker}^{Model}(m)\cdot T_{DSP}^{Model}(m) \end{cases},$$

and the acoustic signal received by the right ear of the target user is expressed as:

$$\begin{cases} CH^{model}_{@R\_Ear}(1) = CH(1)\sum_{m=1}^{M} a_1(m)\cdot H_R^{Model}(m)\cdot T^{Model}_{speaker}(m)\cdot T^{Model}_{DSP}(m) \\ CH^{model}_{@R\_Ear}(2) = CH(2)\sum_{m=1}^{M} a_2(m)\cdot H_R^{Model}(m)\cdot T^{Model}_{speaker}(m)\cdot T^{Model}_{DSP}(m) \\ \vdots \\ CH^{model}_{@R\_Ear}(N) = CH(N)\sum_{m=1}^{M} a_N(m)\cdot H_R^{Model}(m)\cdot T^{Model}_{speaker}(m)\cdot T^{Model}_{DSP}(m) \end{cases},$$

wherein M denotes a number of target channels in the in-vehicle acoustic environment, each of the plurality of target speakers corresponds to respective target channel of the target channels in the in-vehicle acoustic environment, CH(n) denotes an original sound source signal of an n-th channel in the reference acoustic environment, for the target channels in the in-vehicle acoustic environment, there exists m∈[1, M], wherein m is a natural number greater than or equal to 1, $$H_L^{Model}(m)$$

denotes the first acoustic transfer function of an m-th target speaker to the left ear of the target user, $$H_R^{Model}(m)$$

denotes the first acoustic transfer function of the m-th target speaker to the right ear of the target user, $$T^{Model}_{speaker}(m)$$

denotes the first electroacoustic conversion transfer function of the m-th target speaker, $$T^{Model}_{DSP}(m)$$

denotes a digital filter transfer function applied to the m-th target speaker, and $a_n(m)$ denotes an enablement judgement parameter corresponding to the m-th target speaker.

17. The audio control method for the in-vehicle sound system according to claim 13, wherein a plurality of speaker groups are provided in the reference acoustic environment, and a number of the plurality of speaker groups is equal to a number of the plurality of target speakers; and wherein before acquiring the initial auditory model of the target user in the in-vehicle audio environment and the ideal auditory model of the target user in the reference audio environment, the audio control method further comprises:

acquiring, in the reference acoustic environment, a second acoustic transfer function of each respective speaker group of the plurality of speaker groups to an ideal listening position where the target user is located, and a second electroacoustic conversion transfer function of the respective speaker group, wherein the second acoustic transfer function represents acoustic-physiological characteristics of the target user in the reference acoustic environment, and the second electroacoustic conversion transfer function represents software transfer characteristics and hardware transfer characteristics of the respective speaker group; and constructing the ideal auditory model of the target user in the reference acoustic environment based on the second acoustic transfer function and the second electroacoustic conversion transfer function.

18. The audio control method for the in-vehicle sound system according to claim 17, wherein the ideal auditory model is expressed as:

$$\begin{cases} S^{ref}_{@L\_Ear} = \begin{bmatrix} CH^{ref}_{@L_{Ear}}(1) \\ CH^{ref}_{@L_{Ear}}(2) \\ \vdots \\ CH^{ref}_{@L_{Ear}}(N) \end{bmatrix} = \begin{bmatrix} H_L^{ref}(1)\cdot CH(1)\cdot T^{ref}(1) \\ H_L^{ref}(2)\cdot CH(2)\cdot T^{ref}(2) \\ \vdots \\ H_L^{ref}(N)\cdot CH(N)\cdot T^{ref}(N) \end{bmatrix} \\ S^{ref}_{@R\_Ear} = \begin{bmatrix} CH^{ref}_{@R_{Ear}}(1) \\ CH^{ref}_{@R_{Ear}}(2) \\ \vdots \\ CH^{ref}_{@R_{Ear}}(N) \end{bmatrix} = \begin{bmatrix} H_R^{ref}(1)\cdot CH(1)\cdot T^{ref}(1) \\ H_R^{ref}(2)\cdot CH(2)\cdot T^{ref}(2) \\ \vdots \\ H_R^{ref}(N)\cdot CH(N)\cdot T^{ref}(N) \end{bmatrix} \end{cases},$$

wherein $S^{ref}_{@L\_Ear}$ denotes an acoustic signal matrix corresponding to the left ear of the target user in the reference acoustic environment, and $$S^{ref}_{@R\_Ear}$$

denotes an acoustic signal matrix corresponding to the right ear of the target user in the reference acoustic environment, N denotes a number of original sound source channels in the reference acoustic environment, $$CH^{ref}_{@L_{Ear}}()$$

denotes an acoustic signal received by the left ear of the target user, $$CH^{ref}_{@R_{Ear}}()$$

denotes an acoustic signal received by the right ear of the target user, CH( ) denotes an original source signal in the reference acoustic environment, and accordingly, $$H_L^{ref}()$$

denotes the second acoustic transfer function of a target speaker group to the left ear of the target user, $$H_R^{ref}()$$

denotes the second acoustic transfer function of the target speaker group to the right ear of the target user, and $T^{ref}(\ )$ denotes the second electroacoustic conversion transfer function of the target speaker group.

19. The audio control method for the in-vehicle sound system according to claim 17, wherein acquiring, in the reference acoustic environment, the second acoustic transfer function of each respective speaker group of the plurality of speaker groups to the ideal listening position where the target user is located includes:

acquiring sound data returned by a microphone fixed at an ear position of the target user after the respective speaker group outputs a corresponding first test signal, wherein the ear position of the target user is the ideal listening position of the target user in the reference acoustic environment; and generating the second acoustic transfer function of the respective speaker group to the ear position of the target user in the reference acoustic environment based on the sound data.

20. A non-transient computer-readable storage medium storing a computer program, wherein the computer program is configured to implement, when executed by a processor, the audio control method for the in-vehicle sound system according to claim 1.

* * * * *